FIG. 1

Inventor
JACQUES GUILHEM
By Holcombe, Wetherill — Brisebois
Attorneys

Nov. 24, 1964     J. GUILHEM     3,158,459
SELF-DISCHARGING CONTAINER FOR CONVEYING AND STORING
LOW TEMPERATURE FLUIDS OR OTHER MATERIALS
Filed March 20, 1961     9 Sheets-Sheet 3

Inventor
JACQUES GUILHEM
By Holcombe, Wetherill & Brisebois
Attorneys

Nov. 24, 1964 J. GUILHEM 3,158,459
SELF-DISCHARGING CONTAINER FOR CONVEYING AND STORING
LOW TEMPERATURE FLUIDS OR OTHER MATERIALS
Filed March 20, 1961 9 Sheets-Sheet 4

Inventor
JACQUES GUILHEM
By Holcombe, Wetherill & Brisebois
Attorneys

Nov. 24, 1964   J. GUILHEM   3,158,459
SELF-DISCHARGING CONTAINER FOR CONVEYING AND STORING
LOW TEMPERATURE FLUIDS OR OTHER MATERIALS
Filed March 20, 1961   9 Sheets-Sheet 5

Inventor
JACQUES GUILHEM
By Holcombe, Wetherill + Brisebois,
Attorneys

Nov. 24, 1964    J. GUILHEM    3,158,459
SELF-DISCHARGING CONTAINER FOR CONVEYING AND STORING
LOW TEMPERATURE FLUIDS OR OTHER MATERIALS
Filed March 20, 1961    9 Sheets-Sheet 6

Inventor
JACQUES GUILHEM
By Holcombe, Wetherill + Brisebois
Attorneys

Nov. 24, 1964 J. GUILHEM 3,158,459
SELF-DISCHARGING CONTAINER FOR CONVEYING AND STORING
LOW TEMPERATURE FLUIDS OR OTHER MATERIALS
Filed March 20, 1961 9 Sheets-Sheet 7

Inventor
JACQUES GUILHEM
By Holcombe, Wetherill + Brisebois
Attorneys

Nov. 24, 1964  J. GUILHEM  3,158,459
SELF-DISCHARGING CONTAINER FOR CONVEYING AND STORING
LOW TEMPERATURE FLUIDS OR OTHER MATERIALS
Filed March 20, 1961  9 Sheets-Sheet 9

Inventor
JACQUES GUILHEM
By Holcombe, Wetherill & Brisebois
Attorneys

United States Patent Office 3,158,459
Patented Nov. 24, 1964

3,158,459
SELF-DISCHARGING CONTAINER FOR CONVEYING AND STORING LOW TEMPERATURE FLUIDS OR OTHER MATERIALS
Jacques Guilhem, Cite la Neuville, Le Trait, France, assignor of one-half to Societe Anonyme dite: Ateliers & Chantiers de la Seine Maritime, Paris, France
Filed Mar. 20, 1961, Ser. No. 97,058
Claims priority, application France, Mar. 22, 1960, 822,109, Patent 1,266,486; Oct. 3, 1960, 840,175; Dec. 13, 1960, 846,803
13 Claims. (Cl. 62—45)

This invention has for its object a container adapted to contain materials at very low temperatures, especially methane, ethylene, propane or any liquefied or solidified gas having closely related physical properties, so that they may be stored or transported and self discharged at the desired moment.

Generally, such a container comprises, in an external structure forming a support, a metal tank which is fluid tight, properly reinforced, supported and protected by an external laminated heat insulation capable of withstanding pressures resulting from the presence inside the container of said tank and contents thereof. The container is specifically designed to be mounted in a ship having a single hull.

The recited supporting heat insulation is so constructed that it can, without being damaged, withstand a high temperature gradient and may itself serve temporarily as a fluid tight tank.

Such a heat insulation comprises multiple "layers" made from insulating panels. Those panels lying within each layer are assembled edge to edge by means of joints or sliding tongues. The external insulating layer is attached to the strong supporting structure and is jointed, while the intermediate layers are spaced by interposed sliding panels which, in combination with the aforementioned sliding tongues, permit a free thermal contraction of the insulating panels comprising said layers.

The interposed sliding panels contribute to the fluid tightness of the whole structure since they are assembled in an overlapping fashion, so that the possible action of the pressure originating from the liquid causes them to bear one upon another.

In a preferred form of the container according to the present invention, the internal cylindrical tank, the axis of which is vertical, being properly reinforced and surrounded with a heat insulating material, made preferably from closed cell foamed polyvinyl chloride, is contained in a housing constituted by two superposed half shells, said internal tank being directly seated on the insulating material of the lower shell. In order to take-up the play resulting from manufacture and those resulting from a contraction of the inner envelope, the latter is maintained blocked on the insulating material, without any play in a longitudinal direction as well as a transverse direction, with respect to the ship by means, for example, of adjustable centre bearings or by a conical bearing when said axis is vertical.

The heat insulating material may be advantageously completed by introducing a liquid into the space containing the insulation. This liquid may be an oil, a foamed oil obtained from nitrogen, or any other liquid which freezes only at low temperatures, in order, on the one hand, to build up a tight barrier opposing the inherent convection movements of the gas and, on the other hand, to compress one against the other the insulating blocks, owing to the buoyancy of the immersed blocks. Hereinafter said liquid will be termed "impregnating liquid."

The recited introduction of oil has moreover the following advantages:

(a) It builds up an external hydrostatic pressure which may serve to balance, at least partially, the internal hydrostatic pressure originating from the transported product;

(b) It protects the internal envelope against the effects of pitch and roll accelerations, which in effect increase simultaneously the internal and external hydrostatic pressures the changes of which are thus cancelled;

(c) It protects all the oil-dipped insulation part against any moisture seepage;

(d) It protects the external envelope against corrosion;

(e) It takes-up the play resulting from the manufacturing tolerances so far as dimensions are concerned as well as play resulting from contraction of the internal envelope;

(f) It protects the internal envelope and the contents thereof in case of a leak in the ship transporting the container.

In order to avoid the possibility that, upon reheating of the assembly, too important pressures, resulting from Archimedes' thrust, would build-up on the internal tank, means have been provided to withdraw the liquid, as the melt proceeds, into a receptacle therefor. In principle, the levels of the oil and of the product as transported are constratined to bear such a relationship that the Archimedes' thrust resulting from the oil is less than the weight of the internal envelope and the contents thereof.

The insulation of the container is provided as follows. By means of metal studs welded on the internal face of both half shells constituting the external envelope, a plurality of beams are fixed on said face, said beams being for example made from a rigid foam of polyvinyl chloride with closed cells, the edges of such beams being stepped or shouldered. With such an organization, each of the panels constituting the insulating layers is permitted to be fixed by its edges. The number of layers depends upon the temperature differential between extreme temperatures and upon the insulating qualities of the materials used. The greater the temperature differential the greater the number of layers.

The first layer, starting from the outside, is fixed in place by means of metal studs and jointed with some glue or a bituminous emulsion. As for the other layers, each insulating panel is, before assembly, rimmed with a ring of a compressible foam, preferably a closed cell one, siutably glued, so that said belt is compressed by adjacent panels. From the second layer, the panels are maintained by means of one or more pegs, screws or bolts, preferably made from wood. There is thus avoided a circulation of cold between adjacent panels, and fluid tightness as well as insulating of the assembly is improved. The insulating panels preferably consist of a single block made from a rigid foam of closed cell polyvinyl chloride.

With the half shells so thermally insulated, the inside tank is positioned and clamped in the insulation of one half shell and is then attached by means of aforementioned thrust bearings and is afterwards fitted in an overlapping fashion to the other half shell which is then made integral with the former by welding. After having constructed the container, the insulation may be kept under a nitrogen atmosphere so as to avoid any entry of moisture, which is only an additional precaution, since the closed cell materials used preferably for making the insulation do not lose their insulating properties in the presence of moisture. This is accomplished by withdrawing the oxygen in the annular space containing the insulation and then by introducing dry nitrogen and possibly the liquid recited above.

The container for methane, or other product having similar or closely related physical properties, the general characteristics of which have been given above, is provided with the following auxiliary devices which are intended to improve the security of the loading and unloading of its contents.

A discharge pump is disposed at the lower part of the container at one of ends of the same, where it is located in a casing which is tight but accessible for inspection, spaced from the outside by insulating means and an external cover. Under such conditions, any methane or other liquid product which might, by accident, flow out of the pump and the pipes connected thereto would meet three obstructions before it could spread into the atmosphere, namely the casing containing the pump, the insulation and the external cover.

Said tight casing may be maintained under a suitable internal gaseous nitrogen pressure, so that the pump motor and its feed pipes may be kept under an inert atmosphere, even should a leak occur. Said motor may be housed in a special fluid-tight compartment. It is well known in effect that a mix of hydrocarbon with nitrogen cannot explode.

The safety is controllable in response to said inner pressure. Means are provided so that starting of the motor operating the pump is impossible and if already in operation the motor is stopped in the case of a pressure drop.

It is to be noted that such positioning of the pump is not critical and that an immersed pump with a driving motor provided outside may be adapted to the inner tank. Such pump would then be mounted in the container by means of vertical stanchion or pillar.

In the case where the container is applied to sea transport, a special pump, preferably of the floating piston type, described hereinafter in detail, may be connected to the container for drying the latter completely. Such pump and fixtures thereof are also installed in a fluid tight and accessible casing. Said pump could be even positioned inside of the tank.

The internal tank of the container is provided in its inside with one or more auxiliary reservoirs containing liquid nitrogen which is thermally balanced with the methane in said tank. This reservoir or these reservoirs are under such a pressure (about 228.6 p.s.i.) that they constitute a low temperature inert gas source which may be advantageously used in a gas-pressure gage level or as the operating fluid for the drying pump.

The inert gas may also be used for filling the empty space left above the level of the liquid during a draining operation. As the level of the liquid lowers, some gas is added in order to insure an overpressure opposing any dangerous entry of air and any tendency to cavitation of the pump handling a liquid close to its boiling point.

Said reservoir or reservoirs allow further for supplying a possible make-up to the nitrogen pressure in the insulation, so that any undesirable air and moisture entry is avoided.

When the container has its axis vertical, the supporting structure is given, upon its construction, a sufficient strength to make it capable of withstanding an internal pressure of gas, and means are provided so that one may inspect and possibly repair the internal tank at any point on the surface of its upper part as well as its bottom and intermediate wall.

These possibilities are obtained, so far as the roof of the container is concerned, by lining the same with a removable insulation and by providing in its external wall one or more man-holes which are suitably distributed and give access to the roof of the internal tank.

As for the main intermediate wall of said internal tank, one may examine the same through inspection-holes provided at any suitable locations of the external supporting structure and by means of an external staircase serving said inspection-holes, the external surface of said intermediate wall being adapted to be led to a control position, by rotating the internal tank about is axis, said tank being guided by wheels or rolls suitably disposed and supported by a liquid mass previously introduced into the external supporting structure.

The rotational movement of the internal tank may be obtained, either by driving the recited guiding wheels, or by applying a driving torque to the neck of said tank.

So that the bottom of the container may be inspected, said bottom is provided with suitable man-holes and means by which the internal tank may be elevated relatively to the dense insulation of the container.

In an alternative form of the present invention, the internal tank is reinforced by means of a framework constituted by a hollow central beam, which is fixed at its ends to said tank and to which are fixed tubular elements which are in communication one with another. Such reinforcement is necessary when the container is installed in a ship, in order to withstand possible distortions resulting from roll and pitch, so that, so far as the dimensioning is concerned, the sections which are normal to the axis of the container-beam assembly may be rightly considered as being free from any deformation.

Since the aforementioned elements constituting the reinforcing framework of the tank are independent from the tank, they may shrink freely upon introduction of the cold liquid.

Should the tank undergo an internal pressure, it can expand independently from the tubular framework and thus the extraneous bending efforts are cancelled.

So that the object of this invention may be better understood there will be now described purely by way of illustration a number of forms thereof which are shown in the annexed drawings, in which.

There will be first described the form of the invention shown in FIGURES 1, 2, 3, 5, 6, 7, 8 and 9.

Referring to these figures, it can be seen that the reference 1 indicates the internal tank of the container and that the reference 2–2a indicates the thermal insulation housed in the external supporting structure.

Figure 1:
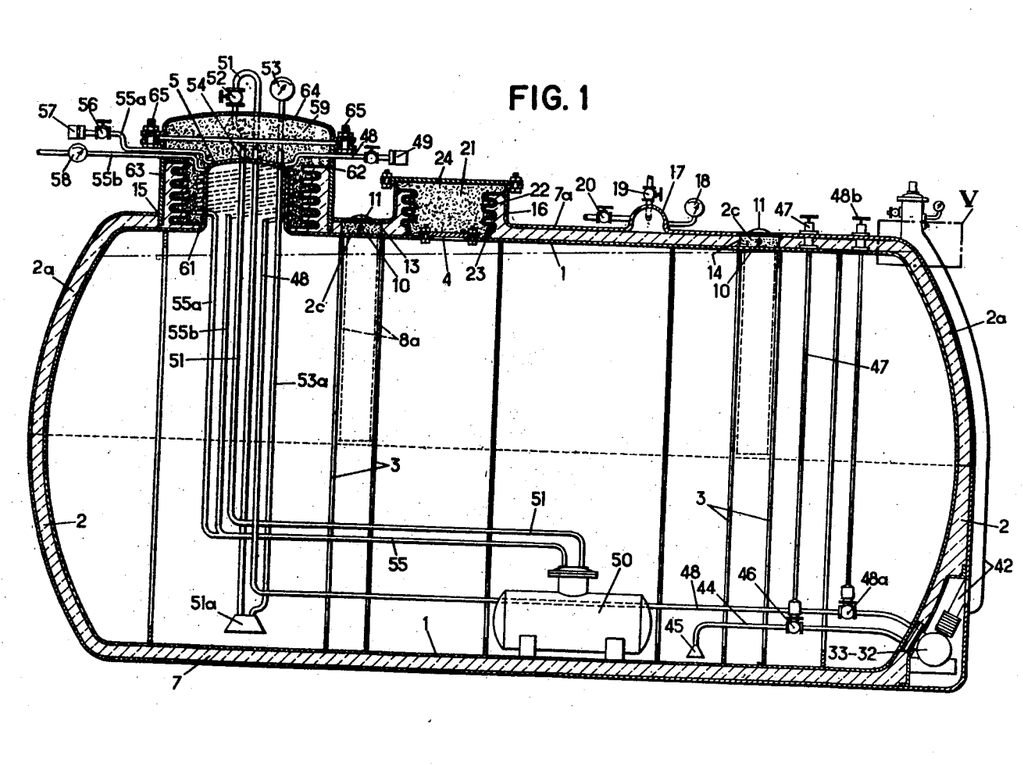
FIGURE 1 is a vertical section through one of these embodiments.
Figures 2, 3:
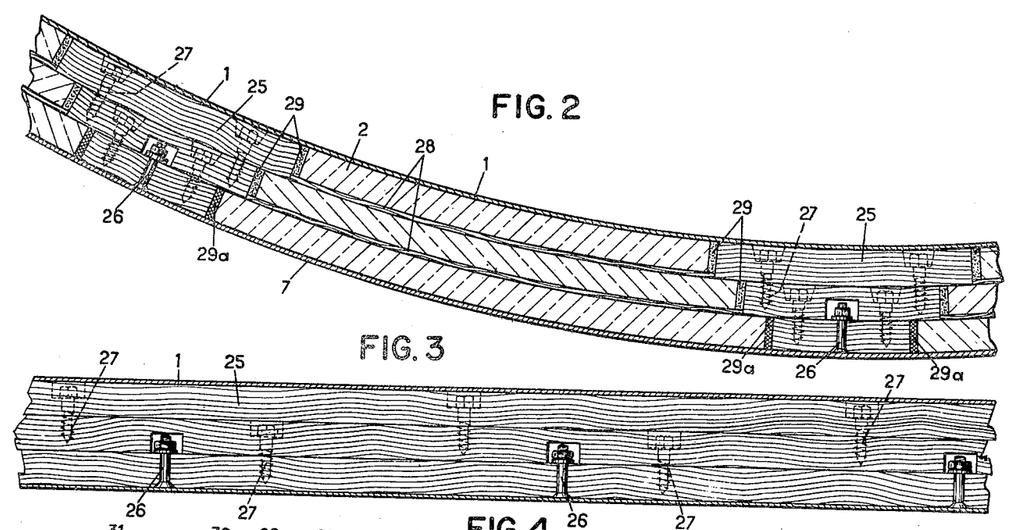
FIGURE 2 is an enlargement of a portion of the bottom of the tank shown in FIGURE 1.
FIGURES 3 and 4 are views analogous to that of FIGURE 2 but taken at right angles thereto and showing respectively the construction of a beam and of the insulation.
Figure 4:
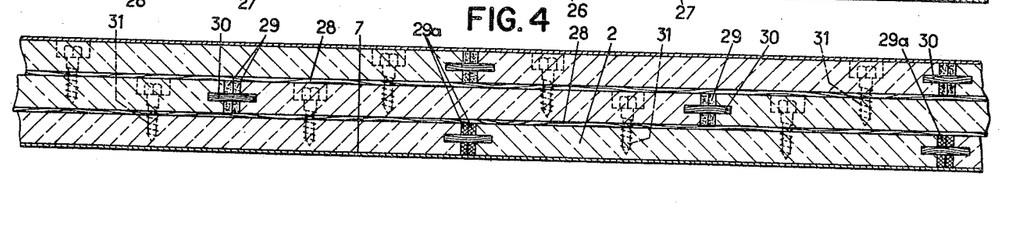

Said tank 1, made preferably from a light weight alloy, is provided with reinforcing members 3 directed toward the direction in which the cold is propagated. It comprises an inspection-hole 4, an expansion dome 5 having outlet orifices for the piping in general and in particular for those described later, said outlet orifices (not shown) being moreover adapted to be pierced at the time of mounting.

The recited external envelope comprises two half shells 7–7a (FIG. 1) which are superposed by joining their free edges 7b so as to cover said insulation 2 which will be described in detail hereinafter.

With the tank 1 lying upon its bottom there is then adapted and welded on half shell 7 the half shell 7a.

Moreover, half shell 7a has an aperture 15 through which passes the dome 5, a coaming 16 corresponding to the inspection-hole 4, and a dome provided with a pressure gage 18, an inlet valve 19 for gaseous nitrogen and an outlet valve 20, the function of which will be explained later.

Recesses 13 and 14 are lined with a flexible insulating material 2c (FIG. 1) made from foamed polyurethane, glass wool or glass rock, or any suitable powdered insulating product.

Inspection-hole 4 (FIG. 1) is covered with a lining 21 made from a powder of fibrous insulating material, housed in a stainless steel bellows 22 which is attached, on the one hand, to the tank 1 at 23 and, on the other hand, to coaming 16 which is capped with a removable fluid-tight cover 24.

Dome 5 for the outlet pipes and its insulation will be described in detail later relating to the internal organization of tank 1.

So far as the insulation is concerned, the following points are to be pointed out.

The temperature gradient which such insulation undergoes is particularly high. Actually, its internal walls are submitted to a very low temperature while, on the contrary, its external walls are substantially at the ambient temperature. Consequently, steps are to be taken so as to avoid building-up of internal stresses capable of resulting in local breaks not compatible with the conditions required for preserving the contents of the container.

Such undesirable stresses are eliminated with the device shown in FIGS. 3, 4, 5 and 6.

As can be seen, insulation inserted between lower half shell 7 and the lower half of tank 1 consists of longitudinal beams 25 suitably spaced. Said beams are made of closed cell polyvinyl chloride rigid foam, or any other suitable material, have a section in the form of a double staircase. They are fixed on studs 26 supported by the internal face on half shells 7. The constituent parts of beams 25 are connected together by means of wood screws or studs 27.

Insulating panels 2, made for example from polyvinyl chloride rigid foam, are separated by sliding panels 28 made from cardboard coated with bakelite or with a film of polyethylene, or any other plastic film, and surrounded by a polyurethane lining 29.

Those of the linings 29 which are horizontal are compressed by blocks 2 which are immersed in the above-defined impregnating liquid.

Figure 5:
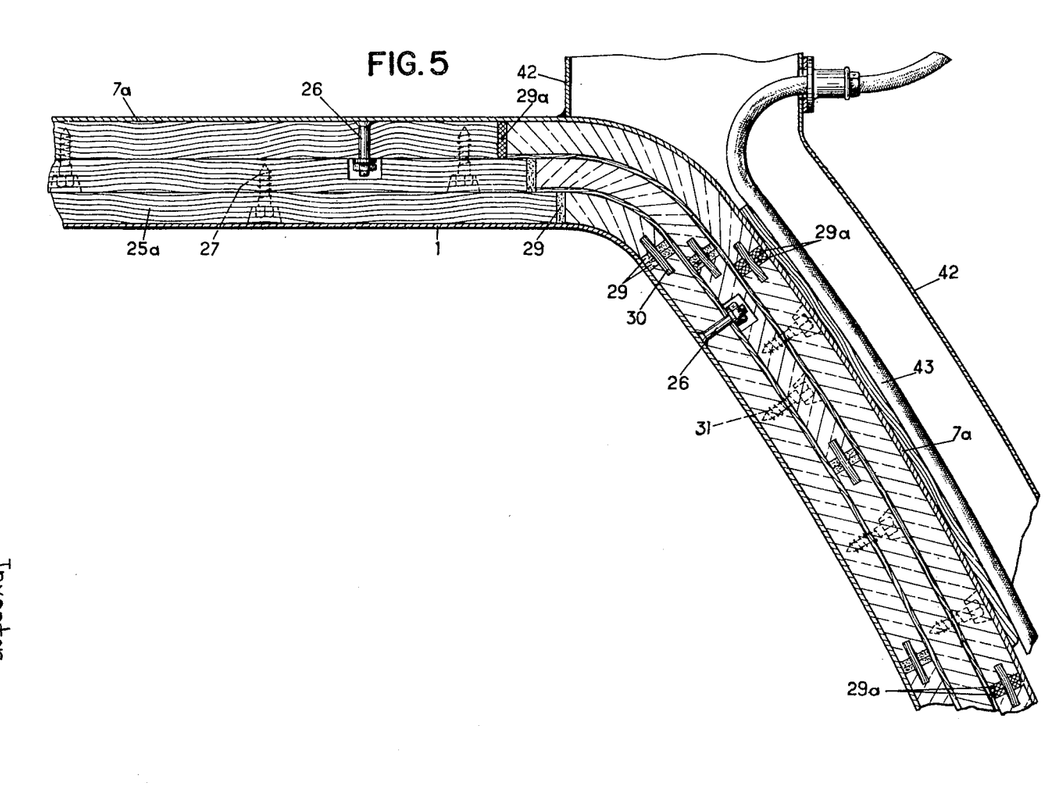
FIGURE 5 is an enlargement of the part designated by V and framed by phantom lines in FIGURE 1.

Relating to the external layer or layers, lining 29 could be replaced advantageously by a sealing joint 29a made from glue or a cement or a suitable bituminous emulsion. Panels 2 are connected to each other by means of tongues 30 and wood screws or studs 31 (FIG. 5).

The sealing effect of elements 29–29d will be enhanced in the lower part of the container by the presence of the "impregnating" liquid.

The upper part of the container is insulated by means of panels 2a attached to beams 25a like the recited beams 25.

As it is easy to understand, this embodiment of the present invention allows for the free thermal contraction of each panel without building-up abnormal stresses in the assemblies. It avoids also damage to the insulation should the external structure distort slightly, which may be the case if the container is installed aboard a ship. On the other hand, the mode of assembling through tongues, intermediate panels 28 and linings 29 and 29a insures a perfect fluid-tightness, so that the insulation is able as a whole to protect the strong external metal structure 7–7a against detrimental cooling in case of accidental leakage from the internal tank.

Figure 6:
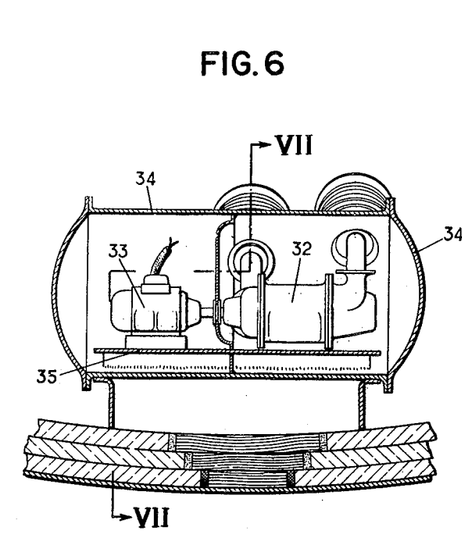
FIGURE 6 is a section taken along the line VI—VI in FIGURE 7.
Figure 7:
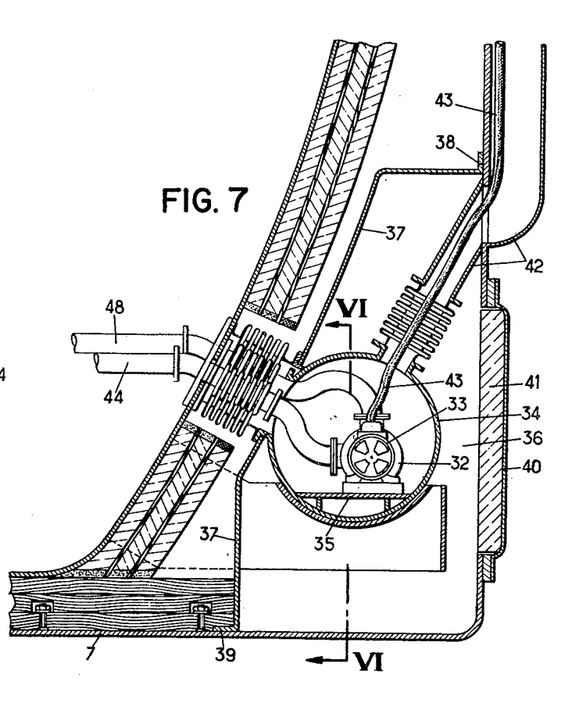
FIGURE 7 is a sectional view taken from the line VII—VII in FIGURE 6.

There will be now described in more detail, with reference to FIGS. 1, 6 and 7, the organization of the recited exhaust or bilge pump for the container.

Said pump, designated by 32, and its motor 33 are mounted in a casing 34 bearing at the lower part of one end of the container on a support 35 disposed in the interior of a chamber 36 formed by a partition 37 which is welded as at 38 and 39 to the lower half shell 7. Access to casing 34 is possible through a tight inspection-door 40, which is suitably insulated as at 41 (FIG. 7) or possibly through a lock-chamber (not shown).

Of course, all the elements integral with casing 34 are surrounded by a suitable insulating material.

Chamber 36 is connected, through a line 42, to a pressurized gaseous nitrogen source (not shown). The conductors 43 supplying motor 33 extend through line 42. This gaseous nitrogen source may consist of the reservoir 50, as will be explained later. Even in case of leakage, the motor and its supply cable are thus maintained in an inert atmosphere, since the methane-nitrogen mixture cannot explode.

Safety is taken care of by measuring the internal pressure in line 42 and casing 34. Means (not shown) are provided in order to insure a shut-off in case of a drop of pressure.

Pump 32 is connected by means of a line 44 to a suction bell 45 located near the bottom of tank 1 (FIG. 1) Said line is provided with a check-valve or bottom sluice-gate 46 the operating member of which is designated by 47. Discharge of the pump is effected through a line 48 which extends along the interior of tank 1, leads to the base of dome 5, extends through the wall of this dome, is coiled about the latter, and terminates at 49 (FIG. 1) or is provided with expansion bellows.

A valve 48a operated by means of an external hand-wheel 48b is mounted in line 48.

The safety device comprises, as mentioned at the beginning of this description, a reservoir 50 containing liquid nitrogen under pressure which is thermally balanced with the methane contained in tank 1.

Besides the supply lines and a discharge valve (not shown), the reservoir 50 is provided with a line 51 extending out of tank 1 through dome 5. The external part of the line 51 is provided with a pressure reducing valve 52, and said line re-enters tank 1 at 54 and extends therein to a bell 51a adjacent the lower part of the tank (FIG. 1). A pressure gage 53, connected to bell 51a by a line 53a indicates the pressure therein.

To the reservoir 50, which is roughly heat insulated, is also connected a line 55 which is divided into two branches 55a and 55b extending out of tank 1 through dome 5. The external part of the branch 55a is provided with a pressure reducing valve 56 in turn connected to a line 57. The branch 55b is provided with a pressure gage 58 by which the internal pressure of capacity 50 is measured.

Where lines 55a and 55b emerge from dome 5 said lines are, just as line 48, wound around dome 5 or are provided with expansion bellows. All these lines are protected by a lining 59 made from an insulating powdered or fibrous material, contained in a stainless steel bellows 60 attached as at 61 to the base of dome 5, and as at 62 to the upper part of a coaming 63 which is welded to the half shell 7a in the aforementioned opening 15.

The assembly is covered by a cap 64, also lined with some insulating material and sealingly attached, for example by means of bolts 65.

With this organization and identical arrangement with respect to the inspection-hole 4, tank 1 is capable to undergo the effects of distortion resulting from contraction thereof without risk of damaging the pipes which are protected by the expansion bellows or impairing either their inherent elasticity or the seal of the assembly.

Should an immersed pump be installed, it would be disposed on a dome identical to that bearing the reference 5 and provided also with a bellows 60.

The organization just described above allows for the following possibilities:

Since the pressure as measured by the pressure gage 53 is proportional to the height of the liquid methane located above bell 51a supplied by line 51, the device permits the level of the liquid methane in tank 1 to be measured;

The gaseous flow escaping from bell 51a avoids any danger resulting from a delay in the boiling of methane;

Gage 58 allows for measuring the pressure in reservoir 50 which corresponds to the vapor tension of the liquid nitrogen at the temperature of the methane, which constitutes a means for measuring the temperature of the liquid methane;

The reducing pressure valve 56 which supplies line 57 makes gaseous nitrogen available either as motive power for operating the drying pump described later, or as inert and dried atmosphere by admitting the same at 19 into the dome 17 where its pressure may be controlled at 18, so as to maintain the thermal insulation 2, 2a and 2b of the container in good condition, or as an extinguishing or degassing means in order to saturate with an inert gas the atmosphere of tank 1 itself or the atmosphere of a ship's compartment, if the container is installed aboard a methane transporting ship.

So far as the use of the container according to this invention is concerned, the same is first filled with liquid methane or another material having similar physical properties, after which reservoir 50 is filled with liquid nitrogen at atmospheric pressure. Reservoir 50 being filled, the pressure therein rises up to the value required for balancing the temperatures between methane and nitrogen.

As mentioned hereinabove, insulation 2–2a–2b may be impregnated with a liquid which freezes only at relatively low temperatures, such as oil or alcohol for example, such liquid being retained by the external envelope 7–7a.

Should the container develop a leak, said impregnating liquid would freeze when contacting the liquid methane and would stop the leak.

Since the insulation consists of a closed cell plastic foam, the quantity of oil which is necessary is small. Said solidified oil joins the plastic blocks one to the other and insures the cohesion of the constituents by hindering, as explained hereinabove, any undesirable convection movement.

Besides the pump and the recited devices, the container is provided with the following attachments (not shown): filling, degassing, withdrawing or make-up gas pipes, safety valves, shearing disks, pressure gages, thermometers, superchargers, gas generators, reliquefying device, etc.

Figures 8, 9:
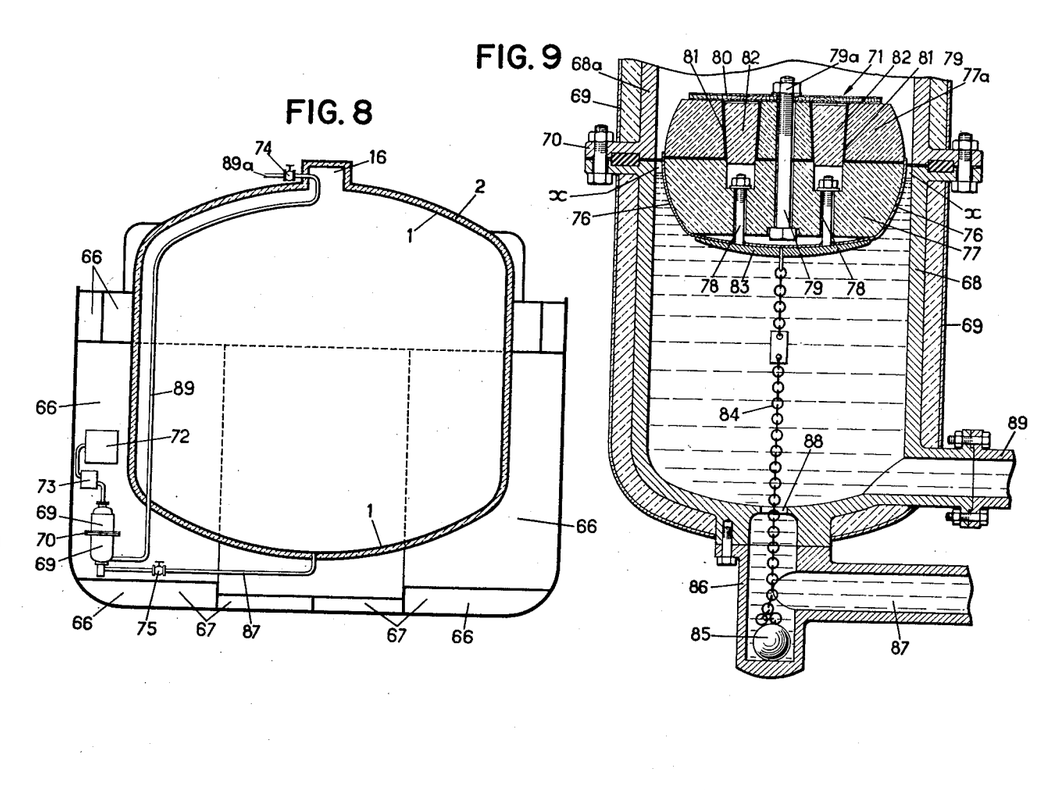
FIGURE 8 is a diagrammatic view showing how a drying or bilge pump is mounted on a container according to the present invention.
FIGURE 9 is a diagrammatic sectional view of the bilge pump shown in FIGURE 8.
Figure 11:
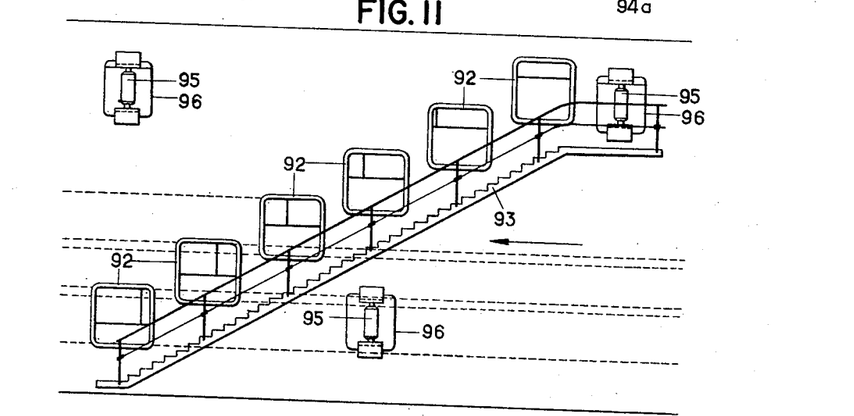
FIGURE 11 is a development of the cylindrical part of the container as seen from the outside.
Figure 12:
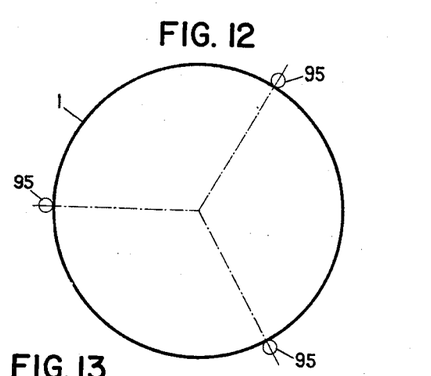
FIGURE 12 is a diagrammatic section taken from the line XII—XII in FIGURE 10.

The cylindrical container which has been described has been constructed in view of its installation in a ship. It is particularly suitable for such application for the following reasons:

(a) Since it is virtually impossible in a ship to locate the rotating pumps adapted to empty the container or containers at a level sufficiently low relatively to the lowest point to avoid internal cavitation, during the terminal step of draining, it is necessary to have a sufficient gas pressure available inside said container or containers; this is the reason why a configuration adapted to the stresses resulting from said pressure has been selected, and a cylindrical envelope terminating in two spherical caps with a connecting torus is particularly sturdy;

(b) In order to install such containers in a ship's hull, the horizontal positioning insures to the ship's deck the longitudinal continuity required for the strength thereof; now, it is well known that a ship may be considered as a box-like beam of which the double bottom and the deck constitute the bases and the walls the web; these conditions are also easy to fulfill in the case vertical positioning as can be seen in FIG. 9;

(c) So that the contained volume for a given heat exchange surface may be at a maximum, it is advisable that the ratio of the container length or height to its diameter be in the neighborhood of 1, and that the diameter be as large as possible, so that the container shape approximates that of a sphere; said ratio, which is imposed by the effectiveness of the thermal insulation, is also very advantageous from the point of view of the ship's design so far as regulations governing transverse partitions are concerned;

(d) The space between the external hull of the ship and the external envelopes of the containers lend themselves particularly, as shown in FIG. 11, to serve as water-ballast tanks 66 or reservoirs for oil products which, in combination with the reservoirs of the double bottom 67 serve to impart suitable stability and trim to the ship.

Although the recited cylindrical container with its axis vertical is the preferred embodiment of this invention, in particular when applied to a ship, the described structural features and mainly the insulation may be easily applied to a container having its axis horizontal.

In addition to the means above described, the container may be provided with some attachments according to its intended function, such as: pipes, connections for equalizing electrical potentials, pumps, outlets for gas, refrigerators, heaters, sumps, special foundations, meters, etc.

It has been mentioned above that the container according to this invention may, namely when it is installed in a ship, be provided with a drying pump.

In such a case, said pump, as well as the discharge pump is located in a housing which is tight and capable of being flooded by the transported product. As mentioned above, it may be housed in the container.

Such a pump must fulfill certain conditions.

In effect, it is known that when one tries to establish above a liquid a gas pressure resulting from gasification of such liquid, higher than vapor tension thereof, said pressure disappears owing to the substantially instantaneous liquefaction of the gas. When another fluid, for example nitrogen, is used, the cooling which results from its contact with the liquid causes an important reduction of the specific volume.

According to the present invention, means are provided to avoid or at least minimize considerably such phenomena.

The pump body (FIGS. 8 and 9) comprises two cylindrical members 68—68a connected by means of flanges 70 and covered with a heat insulation 69 except in the high part 68a of the body, which insures in this region a temperature incompatible with liquefaction.

In the pump body so constituted an insulating floating piston 71 is provided which is movable with some play $x$ (FIG. 9) and is acted upon by a pulsing pressure obtained by suitably regulating the flow of gas from a constant pressure source such as nitrogen.

Said pressure source bears the reference 72 in FIG. 8, and the pulsing member, preferably of the electrical-pneumatic type, is designated by 73. Said pulsating pressure is used to force out any liquid having found its way to the pump body by gravity. Check valves 74 and 75 oppose undesirable fluid movements.

Piston 71 is constituted by a float (FIG. 9) housed in a metal bowl 76 having the same shape as the lower bottom of the pump body 68.

Said float is made from two blocks 77–77a of a fluid-tight cell plastic foam. Block 77 is fixed to the bowl 76 by studs 78, while block 77a is connected to block 77 by a bolt 79, preferably made from wood, the nut 79a of the latter bearing on a washer 80 applied upon the upper face of block 77a.

Drilled bores 81, provided with removable plugs 82 give access, when removed, to the recited studs 78.

Bowl 76 protects the floating piston member against localized coolings by insuring a suitable temperature pattern.

The floating piston thus constructed is provided with a weight 83 insuring self-centering thereof. Owing to its lightness in weight and its substantial volume, said piston floats on the liquid and thus follows the changes of the level of the latter, thus avoiding thermal energy exchanges between liquid and gas which are necessary for the recited liquefaction or the specific value reduction. Jamming is avoided owing to the toroidal or spherical shape of the lateral wall of the piston and the play or clearance x provided for this purpose.

So far as the clearance or play is concerned, the same could be filled with one or several segments made from perfluoropolyethylene or any suitable material, of a plastic character or the like.

The lower part of bowl 76 is connected by means of a chain 84 to a valve 85 housed in a cylinder 86 into which opens the line 87 supplying the liquid, said cylinder communicating with the inside of the pump body 68 through an orifice 88 through which passes the chain 84. Valve 85 serves to limit filling of the pump body.

Discharge of the pump so realized is effected through a line 89 extending through the container and opening outside thereof through coaming 16.

In the embodiment shown in FIGS. 10 to 15, inclusive, the external structure 7—7a of the container has been given a shape and dimensions such (FIG. 10) that said structure is capable of withstanding an internal gas pressure. Under such conditions, should tank 1 develop a leak, the gas originating from the vaporization of the liquid escaping from the tank will be confined in the intermediate space containing insulation 2 and, owing to the back-pressure thereof, it will limit the leak rate, thus insuring a thermal insulation approximately that insured in the absence of leak.

In the case of FIGS. 1 to 9, insulation 2a of the upper part of roof of the container is identical to that of the lower part. According to the embodiment shown in FIGS. 10 to 15, inclusive, these two insulations are different. Insulation 2a of the roof consists of either a powdered or a fibrous product, and it is so made as to be easily disconnectable. Its thickness has been increased in order to enlarge the space between the two walls 1 and 7a and to allow for an operator to get into said space through an opening 90 (FIG. 10).

The material constituting insulation 2 is retained by a joint 91, made of fabric or other material sufficiently porous so as the pressures between insulations 2 and 2a may be equalized.

It can be recognized that after dismantling insulation 2a it is an easy matter to inspect and possibly repair any point in the roof of internal tank 1.

Figure 10:
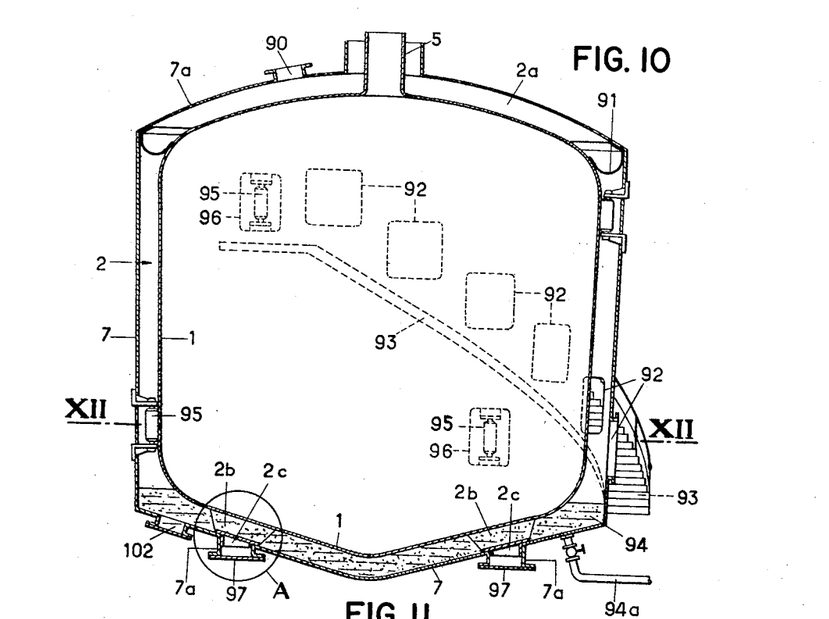
FIGURE 10 is a diagrammatic axial section of an alternative form of the container according to this invention.

To inspect and possibly repair and inspect the cylindrical wall of tank 1, there has been provided in the external structure 7 a set of windows 92 which are disposed in a spiral fashion, access to these windows being possible by means of a staircase generally indicated by the reference 93 (FIGS. 10 and 11).

As hereinbefore mentioned, so that all the points of surface of tank 1 may register with such windows, said tank must be capable of turning about its axis.

To this end, after having partially dismantled joint 91 and those attachments which would oppose said rotation, such as piping, etc., tank 1 is constrained to float on a liquid mass 94 admitted under pressure in the lower part of structure 7 through the line 94a.

It must be noted that such admission of liquid 94 has no drawback whatever so far as the insulating properties of the materials used for constituting insulation 2 are concerned, since such materials are of the closed cell type.

During its rotation, tank 1 is guided relatively to the supporting structure 7 by a plurality of rolls 95 disposed in windows 96 which are closed in a sealed manner during operation. It is to be noted that these rolls may be advantageously constituted by automobile road wheels provided with their tires. The rotational movement is obtained, as explained above, either by powering one or several of the rolls 95, or by applying an operating torque on the dome 5 of tank 1.

Figure 18:
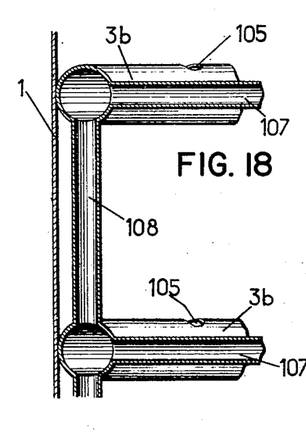
FIGURE 18 is an enlarged sectional view showing the connection of the tubular elements of the reinforcing framework.

So that the external wall of the bottom of tank 1 may be inspected, one or several man-holes 102 are provided in the supporting structure 7, and plugs 2b adapted so as to be displaced relative to insulation 2, are placed in the latter. Accordingly, these plugs 2b comprise an extension 2c which guides them in coamings 7a with which structure 7 is provided and which are normally closed by means of plates 97 (FIGS. 10 and 18).

When it is desired to inspect the external wall of the bottom of tank 1, the plate 97 is replaced on each coaming 7a by a flange 98 provided with a packing 99 (FIG. 14) and a supporting column 100 is introduced through said flange which may be operated by means of jacks 103 for example. Tank 1 is then elevated by means of a complementary admission of liquid 94, which results in a reduction of the space which contained previously insulation 2a of the roof and in establishing, between insulation 2 and the external face of the bottom of tank 1, an empty space which is sufficient so that a man may move about within said empty space after having entered through the abovementioned hole 102.

Figures 13, 14:
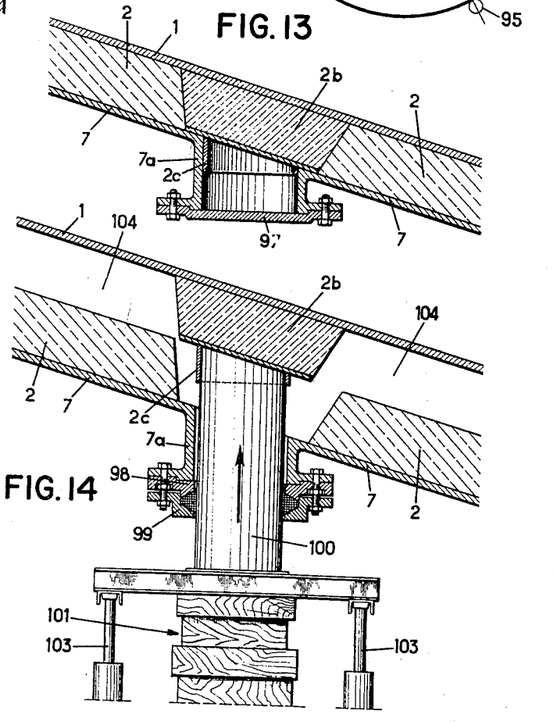
FIGURE 13 is a detailed view at an enlarged scale of the encircled part A in FIGURE 10.
FIGURE 14 is a view corresponding to FIGURE 13, showing how a supporting column is positioned under the internal tank.

When tank 1 has been so led to its upper position, jacks 103 are operated which lift the supporting columns 100 and the recited plugs 2b by applying the latter against the corresponding part of tank 1 (FIG. 14). Columns are then set in their elevated position by means of chocks 101. The liquid 94 is withdrawn through line 94a and the operator in charge of the inspection may enter the space 104 thus freed between insulation 2 and the external face of the bottom of tank 1. Inspection of the bottom of tank 1 may then be carried out. After checking and if necessary repairing, the disassembled elements are replaced to their initial position.

Figure 15:
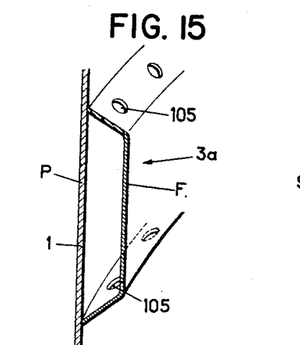
FIGURE 15 is a fragmentary view showing a form of reinforcing members in the case where they are not parallel to the direction in which the cold is propagated.

In order to cool the structure of tank 1, it is filled by means of a dip tube terminating near the bottom thereof, so that excessive temperature differentials do not occur during such filling. During this operation, temperature changes at the container skin are not the same as those of the reinforcing members. Said reinforcing members could, without inconvenience consist of U-shaped iron sections 3a with inclined flanges, and holes 105, welded on tank 1 by the edge of said flanges as shown in FIG. 15. It may be seen that the thermal changes of the web F of the channel iron are parallel to those of the wall P of internal tank 1 and that the angle of the flanges imparts to the annulus member thus constituted some degree of elasticity.

Holes 105 have the function of communicating the inside of reinforcing members 3a with the inside of the tank, thus maintaining almost unchanged the capacity of the tank.

It is to be noted that the lower part of the external container may advantageously consist of steel having a good resiliency at low temperatures (e.g. a steel containing 9% of nickel) or stainless steel, the upper part being made from plain steel, if desired.

In effect, should a leak develop, only the lower part of the container is in contact with the cold liquid, the upper part alone being submitted to a gas pressure.

There will be now described the alternative embodiment comprising a hollow central beam shown in FIGS. 16 to 19.

Figure 16:
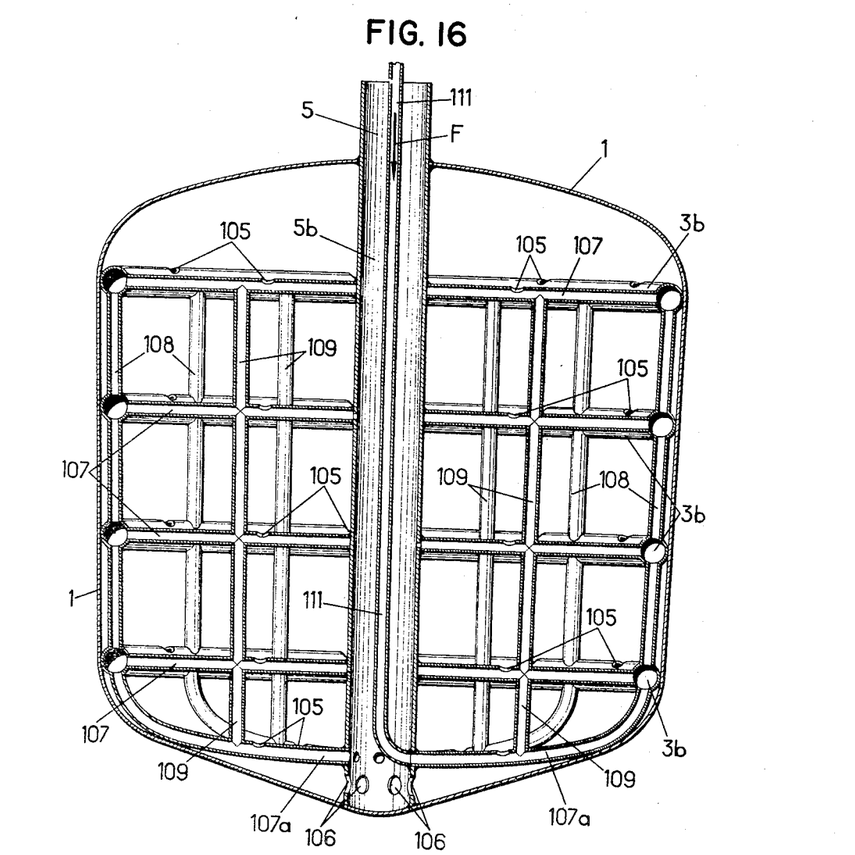
FIGURE 16 is a vertical diagrammatic section of the reinforcing framework of another form of the present invention.
Figure 17:
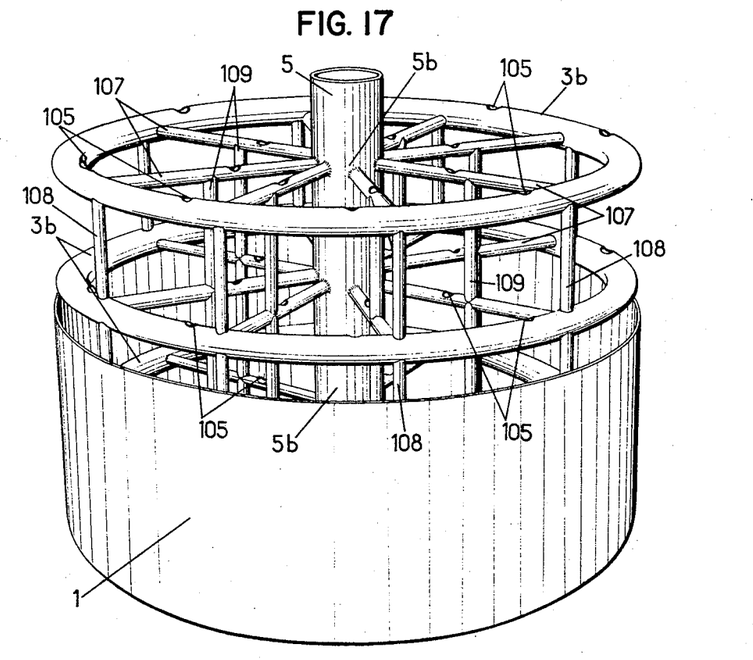
FIGURE 17 shows in perspective the framework illustrated in FIGURE 16, with the tank thereof in the course of construction.

According to the present invention, dome 5 of tank 1 constitutes one end of a tubular post or beam 5b, the end of which is provided with orifices 106 and is welded to the bottom of said tank. The reinforcing members, which are intended to maintain under any circumstances the circular shape of the skirt of tank 1, consists of tubular rings 3b connected to the central beam 5b by radial tubes 107 vertically braced by tubes 108. If radial tubes 107 have such a length that they may vibrate, tubular vertical tie-rods 109 may be used so that the required rigidity is obtained. All the tubular framework is provided with holes 105 which serve to connect the inside of the tubular members with the container itself, so that its effective capacity is not substantially reduced.

There is thus provided a framework in the shape of a squirrel cage capable of maintaining the shape of tank 1 and of resisting any ovalization of the latter. At the time of the initial cooling, the tubular framework and the skin do not have, owing to independence thereof, any undesirable interactions, as would be the case should welded reinforcing members be used.

It must be noted that the presence of the recited framework lends itself to a particularly easy construction of the container. In effect, besides the scaffolding possibilities afforded thereby, it aids, owing to the rings 3, the "tiering" of the metal sheets constituting tank 1, as well as their temporary connection with a view to welding them one to another.

Moreover, in operation, said framework takes-up the static electrical charges which might develop upon movements of the liquid and leads them to the metal envelope.

Figure 19:
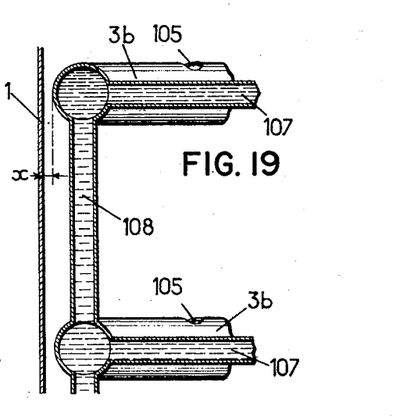
FIGURE 19 is a view corresponding to FIGURE 18 but in which the relative positions of the tubular framework and the internal tank are those existing when said tank undergoes an internal pressure.

Referring to FIG. 18, tank 1 is, tangential to rings 3b. On the other hand, as shown in FIG. 19, said tank may be spaced therefrom by a clearance x, either when the tubular framework comprising rings 3b is colder than tank 1, or when said tank becomes expanded by the action of an internal pressure.

As mentioned hereinbefore, since an independent framework is thus available, extraneous bendings of tank 1 are avoided, the rigidity of the tank being thus strictly maintained, which allows for a reliable and easy dimensioning thereof.

It is to be pointed out, finally that the weight of the tubular framework is supported, on the one hand, by the embedment of all the radial members 107 in the tubular central post 5b and, on the other hand, by the bearing action of the radial lower members 107a and by the tie-rods and the vertical braces 108 and 109.

In the case where for causes external to the container, such as roll or pitch movements if the container is installed aboard a ship, there would develop a tendency for the tank 1 to become ovalized. The bending stresses which would develop in the tank skirt are easily computable, the absence of connection between the latter and the framework being taken into consideration. These bending stresses are very low and do not require to increase the thickness of the skirt under usual circumstances.

Having thus described and shown this invention, it is to be positively understood that many changes or modifications as to detail may be introduced by those skilled in the art without thereby departing from the spirit of the invention and that the invention is therefore not limited to the specific embodiments thereof described in the specification, but is defined by the following claims.

What I claim is:

1. A container for very low temperature materials, particularly liquefied or solidified gas, said container compising an inner fluid tight tank, an outer tank surrounding and spaced from said inner tank, and laminated heat insulation between said tanks, said heat insulation comprising a plurality of layers, each composed of a plurality of rigid insulating panels, the panels of each layer being separated from the other panels in the same layer by strips of yielding material, and the surfaces of at least some of the panels in each layer being slidable with respect to the surfaces of the adjacent panels in adjacent layers to allow free thermal contraction and expansion of said insulating panels.

2. A container as claimed in claim 1 in which the adjacent edges of adjacent panels lying in the same layer are formed with pairs of registering recesses and rigid connecting tongues slidably extending through said strips of yielding material into both recesses of each pair serve to maintain the panels of each layer in alignment with each other.

3. A container for very low temperature materials, particularly liquefied or solidified gas, said container comprising an inner fluid tight tank, an outer tank surrounding and spaced from said inner tank, and laminated heat insulation between said tanks, said heat insulation comprising a plurality of layers, each composed of a plurality of rigid insulating panels, the panels of each layer being separated from the other panels in the same layer by strips of yielding material, and thin sheets of material separating at least some of the panels in each layer from the panels in an adjacent layer, the surfaces of said separated panels being slidable on the surfaces of said sheets.

4. A container as claimed in claim 3 in which the insulating panels and thin sheets are secured to one another by means of wooden fasteners.

5. A container as claimed in claim 1 comprising means for maintaining an auxiliary supply of an inert gas under pressure at the same temperature as that of said container, and means to lead said inert gas at said temperature and at a predetermined pressure into the inner tank itself and between the inner and outer walls of the container; thereby maintaining a predetermined pressure in both places.

6. A container as claimed in claim 1 comprising an auxiliary tank positioned within said inner tank for maintaining an auxiliary supply of an inert gas under pressure at the same temperature as that of said container, and means to lead said inert gas at said temperature and at a predetermined pressure into the inner tank itself and between the inner and outer walls of the container; thereby maintaining a predetermined pressure in both places.

7. A container as claimed in claim 6 comprising a discharge pump positioned within said inner tank, said discharge pump comprising a body, a thermally insulated float piston mounted for limited reciprocation within said body, and inlet and discharge openings for said liquefied gas in said body on one side of said piston, means for supplying said inert gas under pressure to the other side of said piston, and means for causing a pulsation in said supply of inert gas to said pump.

8. A container as claimed in claim 7 comprising a weight attached to said piston and positioned centrally thereof so as to urge said piston into a central position with respect to the portion of said body within which said piston floats.

9. A container as claimed in claim 1 in which alternate panels in each layer are fastened to the adjacent panels in the adjacent layers to form therewith a beam having stepped edges.

10. A container as claimed in claim 1 comprising means for separating said heat insulation from said inner tank at any point so as to permit inspection and repair of said inner tank.

11. Container as claimed in claim 1 in which said outer tank is cylindrical and comprising a supporting tank within which said outer tank is mounted to rotate about a vertical axis; a roof for said external tank including removable heat insulation; man-holes in said roof to give access to the top of said inner tank; a plurality of windows arranged in a spiral fashion around the supporting tank; means for rotating said inner tank about its vertical axis and for guiding said inner tank relatively to its supporting tank; man-holes in the intermediate part of said supporting tank; a plurality of windows to reach the bottom of said inner tank and means to lift said inner tank relatively to the insulation of said container, so that an operator may enter and move about within the space between the bottom of said inner tank and said insulation resulting from said lifting.

12. A container as claimed in claim 1 comprising an axial beam supporting a plurality of reinforcing rings just inside but independent of said inner tank, so as to permit limited contraction of said inner tank before support therefor is provided by said rings.

13. A container as claimed in claim 12 in which said axial beam is connected to said rings by means of radial supports and said beam, rings and supports are hollow and apertured to communicate with the interior of said inner tank.

References Cited in the file of this patent
UNITED STATES PATENTS

| | | |
|---|---|---|
| 1,452,487 | Auchincloss | Apr. 24, 1923 |
| 1,930,731 | Thompson | Oct. 17, 1933 |
| 2,049,987 | Willenborg | Aug. 4, 1936 |
| 2,395,113 | Goddard | Feb. 19, 1946 |
| 2,512,552 | Quarfoot | June 20, 1950 |
| 2,552,641 | Morrison | May 15, 1951 |
| 2,859,895 | Beckwith | Nov. 11, 1958 |
| 2,982,441 | Farrell et al. | May 2, 1961 |
| 2,986,011 | Murphy | May 30, 1961 |
| 3,030,669 | Dosker | Apr. 24, 1962 |
| 3,050,951 | Gebien | Aug. 28, 1962 |
| 3,054,525 | Silvis | Sept. 18, 1962 |
| 3,079,026 | Dosker | Feb. 26, 1963 |

FOREIGN PATENTS

| | | |
|---|---|---|
| 614,724 | Canada | Feb. 14, 1961 |